March 18, 1969  G. H. KÄRRBERG  3,433,274
APPARATUS FOR THREADING OR SCREWING TOGETHER
THE ENDS OF HELICAL SPRINGS
Filed Oct. 18, 1965
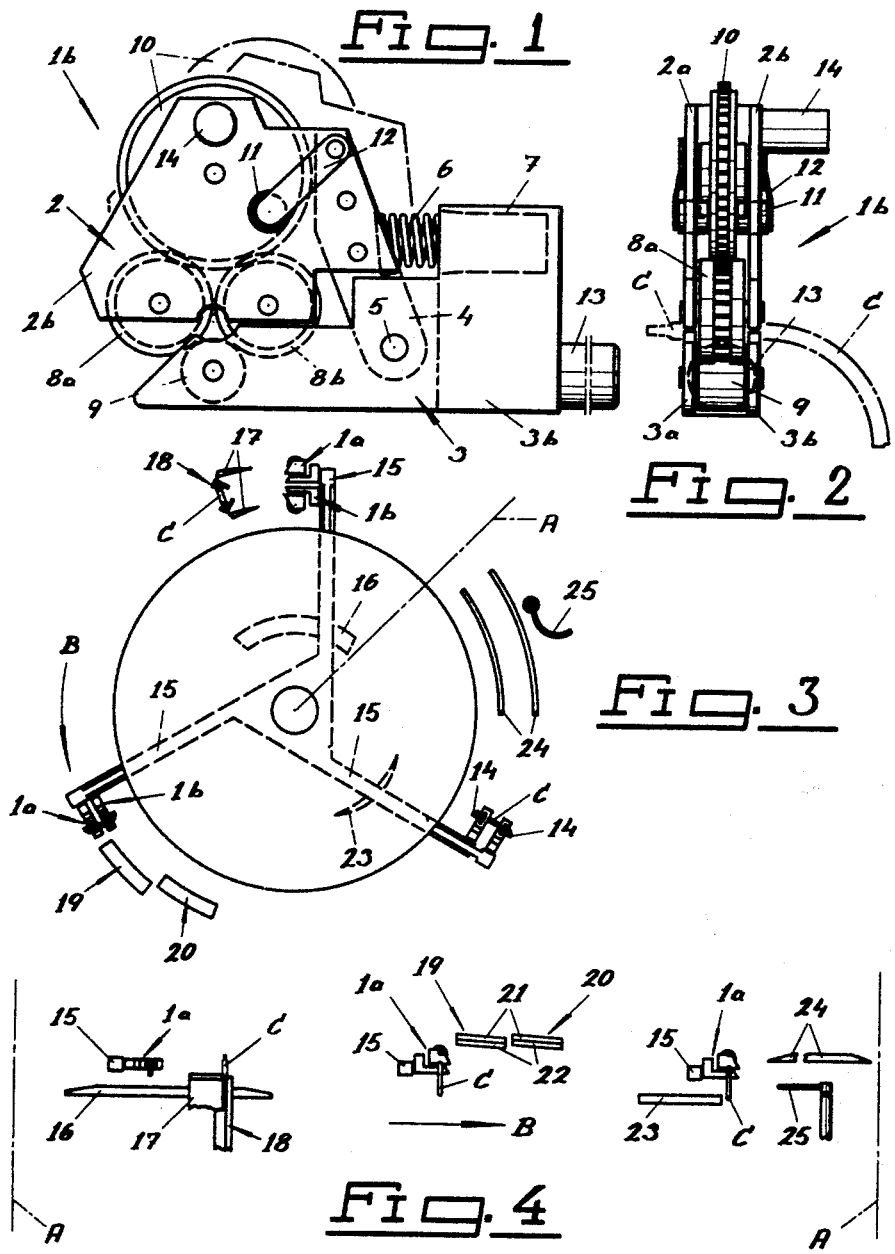

United States Patent Office 3,433,274
Patented Mar. 18, 1969

3,433,274
APPARATUS FOR THREADING OR SCREWING TOGETHER THE ENDS OF HELICAL SPRINGS
Gustaf H. Kärrberg, Goteborg, Sweden, assignor to Wafios Maschinenfabrik Wagner, Ficker and Schmidt, Wittenberg, Germany
Filed Oct. 18, 1965, Ser. No. 496,855
U.S. Cl. 140—88      12 Claims
Int. Cl. B21f 15/02

ABSTRACT OF THE DISCLOSURE

A machine for producing components of ring shape by threading one end of a helical spring into the other end thereof in which a head is provided with a plurality of wheels with one of the wheels being movable in relation to the other wheels. The wheels are arranged to grip and rotate one end of the spring and the other end thereof is held in end to end engagement with the first mentioned end by suitable means.

---

The present invention relates to means for forming springs of ring shape and, more particularly, to an apparatus for threading or screwing together the end portions of helical springs to provide a ring-shaped component and in which one end portion of the spring is of smaller diameter than the other end portion for enabling such end portion to be threaded into the opposite end portion of the spring.

A salient object of the invention is to provide a simple and dependable apparatus by means of which the respective end portions of springs having diameters and lengths varying within wide limits may be threaded or screwed together with very little or no readjustment of the components of the apparatus being required.

Generally, the invention comprises at least one head preferably having incorporated therewith three wheels for gripping one end portion of the spring, with the wheels being adapted upon rotation thereof to turn the end portion of the spring to thread the same into the opposite end portion of the spring, and gripping means for holding one end portion in resilient coaxial and end-to-end engagement with the rotating or turning end portion of the spring.

More specifically, at least one of the wheels of the head is movable relative to the other wheels and coacts in such a fashion with cam means to move such wheel in a direction away from the other wheel or wheels against the action of spring means for gripping or releasing the end portion of the spring, and the gripping means comprises a head substantially similar structurally to the first mentioned head with the wheels being located pair-wise in order that the wheels of one head will be substantially coaxial with the corresponding wheels of the other head when the respective heads are in a positional relationship permitting the threading or screwing together of the end portions of the spring.

Further objects and advantages of the invention will become more readily apparent from the following detailed description and drawings, and in which drawings:

FIGURE 1 is a part view in side elevation of an apparatus embodying the present invention, FIGURE 2 is an end view of the apparatus as viewed from the left in FIGURE 1, FIGURE 3 is a diagrammatic plan view of the apparatus, and FIGURE 4 is a diagrammatic view illustrating the circular path described by parts of the apparatus during operation as viewed from one side of the apparatus.

In the embodiment shown in the drawings, the apparatus includes three pairs of heads 1a and 1b which function to thread or screw together the end portions of helical springs and, to distinguish between the respective heads in the following description, the head 1a will be referred to as the left hand head and the head 1b the right hand head.

As shown in FIGURES 1 and 2, each of the heads 1a and 1b comprises two main components 2 and 3, respectively. The component 2 of each head includes a pair of spaced apart side plates 2a and 2b fixed to an arm 4. The arm 4 is oscillatably mounted on a short shaft 5 carried by side plates 3a and 3b and a pressure spring 6 is located between the components 2 and 3 with one end of the spring being lodged in a recess provided in the arm 4 and the opposite end located in a recess 7 formed in the component 3. Manifestly, the spring 6 normally holds the components 2 and 3 in the position disclosed in FIGURE 1. Each of the heads 1a and 1b is provided with three wheels 8a, 8b and 9. The wheels 8a and 8b are rotatably mounted between the side plates 2a and 2b of the component 2, while the wheel 9 is rotatably mounted between the side plates 3a and 3b of the component 3. The wheels 8a and 8b, which can be moved in a direction away from the wheel 9 by swinging the component 2 about the shaft 5 against the action of the spring 6 or towards the wheel 9 by the pressure of the spring 6, are each provided with a centrally located gear portion 8c of lesser diameter than the laterally adjacent parts of the wheel denoted 8d. The gear portions of the wheels 8a and 8b are adapted to engage with corresponding teeth 10a on a gear wheel 10 rotatably mounted between the side plates 2a and 2b above the wheels 8a and 8b. In other words, the teeth 10a are adapted to mesh with the gear portions 8c on the side of the apparatus opposite to that with which the wheels 8a and 8b engage the wheel 9 of the component 3.

The primary function of the gear wheel 10 is to drive the wheels 8a and 8b but, in addition, the gear wheel 10 also serves for restraining the wheels 8a and 8b from accidental or unintentional rotation and, to achieve such end, the component 2 has associated therewith a friction brake means acting upon the gear wheel 10. As illustrated, the brake means includes a pair of cylindrical brake shoes 11 which are urged against the side faces of the gear wheel 10 (FIGURE 2) by leaf springs 12 attached to the side plates 2a and 2b with the free ends of the springs bearing against the outer ends of the brake shoes 11, which outer ends project through guide apertures formed in the side plates 2a and 2b.

The periphery or circumference of the parts 8d of the wheels 8a and 8b are provided with teeth (not illustrated) or are otherwise treated for increasing friction in order that when the wheels are driven by the gear wheel 10 a helical spring introduced between the wheels 8a, 8b and 9 will be rotated without slippage. The wheel 9 may be provided in a similar fashion with means for increasing friction, such as by forming the surface thereof in such a manner as to prevent unintentional axial displacement of the spring.

Each head 1a or 1b is arranged to rotate about a shaft 13 which is fixed to the component 3 perpendicularly to the wheels in order that the heads may be turned toward and away from each other between a perpendicular position wherein the heads of each pair are located alongside of each other at a comparatively short distance apart and a horizontal position wherein the heads of each pair are turned away from each other, as illustrated by a pair of heads in the upper portion of FIGURE 3. Moreover, the component 2 of each head is provided on that side plate which, in the vertical position of the heads, is turned away from its companion head, with a pin 14 which projects in a direction parallel to the axes of rotation of the wheels. in other words, as shown in FIGURE 2, the pin 14 is carried by the side plate 2b of the component 2. As a consequence, the components 2 supporting the wheels 8a and 8b may be turned away from the component 3 which supports the wheel 9 against the action of the spring 6.

Referring to FIGURE 3, it will be noted that each pair of heads 1a and 1b is mounted on one of three arms 15, which arms together constitute a rotary structure. Each arm 15 is composed of two parts which are axially displaceable relative to each other and each part carries one of the heads of a pair turnable about the shafts 13 which are mounted in the corresponding part of the arm. The shafts 13 are adapted to be turned through an arrangement of links or the like (not illustrated) between the above mentioned vertical and horizontal positions when actuated by a cam member 16 provided for this particular purpose. The cam member 16 is located in the area of the point at which one cycle of operation terminates and the next cycle begins, as denoted by the dot-dash line A which discloses the imaginary line of separation between the cycles when the rotor structure rotates in a counter-clockwise direction. The line A is also shown at both ends in FIGURE 4, which view depicts the three pairs of heads in positions corresponding to those shown in FIGURE 3.

When one of the pairs of heads is moved by the rotor structure along a circular path in a counter-clockwise direction past the cam member 16, as indicated by the arrows B in FIGURES 3 and 4, the heads 1a and 1b of the pair will be moved through the action of the link arrangement in a direction away from each other to the horizontal positions shown at the upper part of FIGURE 3. After the heads 1a and 1b have been moved to the above mentioned horizontal position, the heads will be carried during the continued counter-clockwise rotation of the rotor structure over two substantially wedge-shaped cam members 17 which, as the heads pass therealong, engage the pins 14 which, in this position, are directed downwardly whereby the components 2 of the heads will be moved away from their corresponding components 3 against the action of the springs 6. Consequently, the wheels 8a and 8b of each head are moved away from the wheels 9 and while the components 2 and 3 are in these relative positions, the heads 1a and 1b are moved over a spring holder 18. The spring holder 18 is constituted by a pair of angle bars and a helical spring C, the end portions of which are to be joined by threading or screwing together. Such end portions are placed in the holder 18 and thus bent to a substantial U shape. The end portions of the spring project from the tops of the angle bars wherein the spring is retained by its own resiliency.

When the heads 1a and 1b pass the holder 18, the end portions of the spring C will thereby enter between the wheels 8a, 8b and 9 of the respective heads and extend or project somewhat beyond the sides of the head. The wedge-shaped cam members 17 are located in such a relationship to the spring holder 18 that when the wheels 9 of the heads 1a and 1b are positioned directly opposite the end portions of the springs, the pins 14 of the components 2 will have passed entirely by the cam members so that in this position the components 2 will, by virtue of the pressure of the springs 6, be turned or moved toward the components 3 whereupon the wheels 8a and 8b will coact with the wheels 9 to grip the end portions of the spring C.

When the spring C has been thus gripped by the heads 1a and 1b, the heads during the continued movement past the cam member 16 in the counter-clockwise direction will again be turned or moved upwardly towards each other to assume the vertical positions whereby the two end portions of the spring C will be brought into end-to-end engagement with each other with the end portions accurately centered opposite each other. If desirable, the above mentioned turning movement may be arranged to occur simultaneously with a relative displacing movement of both parts of the arm 15 in order that the heads 1a and 1b are first moved to the vertical positions and thereafter moved closer to each other whereby the end portions of the spring will first, after this action, be moved into engagement with each other.

During the continued counter-clockwise movement of the heads 1a and 1b, the head 1a will pass beneath a rolling track 19 and when the head has left the track 19, the head 1b will pass beneath a corresponding rolling track 20. The tracks 19 and 20 each consist of a holder 21 which is adjustable by suitable means (not shown) in the vertical direction, and a pad 22 of suitable elastic material such as rubber or a soft plastic is attached to the lower surface of each holder. As best shown in FIGURE 4, the tracks 19 and 20 are mounted in a slightly downwardly inclined position relative to the direction of movement of the heads in order that the gear wheels 10, the peripheries of which project slightly above the upper ends of the heads (FIGURE 1), will be brought into engagement with the lower faces of the pads 22 toward the termination of the rolling movement, that is to say, when the turning moment necessary for twisting the corresponding end portion of the springs is greatest. The above mentioned mounting of the tracks 19 and 20 is particularly efficacious in that the period during which the rolling movement is caused to take place will be automatically adjusted relative to the circumference of the spring being processed so that when the ends of a larger spring C are being joined a longer rolling distance will be realized. This result is effected since the component 2 and, as a consequence, the corresponding gear wheel 10 will be raised higher when a larger spring is inserted in the head and thus the gear wheel 10 will contact the tracks 19 and 20 at an earlier interval during the rolling period.

When the head 1a passes beneath the track 19 its gear wheel 10 will be caused to rotate by virtue of direct contact between the gear wheel and the pad 22 so that the gear wheel will drive the wheels 8a and 8b and the end portion of the spring C located between the wheels 8a and 8b and the wheel 9 will be rotated in the unthreading or "screwing off" direction of the spring. During this operation, the other end portion will be held fast between the wheels 8a, 8b and 9 of the head 1b by the brake shoes 11 and springs 12 coacting on the gear wheel 10 of the head 1b and an initial twist is thereby imparted to the spring C. When the head 1a has left or passed beyond the track 19, the head 1b will move below and into operative relationship to the track 20 whereby the end portion of the spring between the wheels 8a, 8b and 9 of the head 1b will be rotated in a corresponding manner in the threading or "screwing on" direction, whereas the first mentioned end portion is restrained from rotation in the head 1a by the action of the brake shoes and springs 11, 12 respectively, of the head 1a. The end portions of the spring which engage each other under slight resilient pressure will thereby be threaded together while the heads 1a and 1b are moved closer together by relative movement of the two parts of the arm 15.

By the proper adjustment of the height of the tracks 19 and 20 and the braking effect of the brake shoes and springs 11 and 12, respectively, on the gear wheel 10, the necessary turning movement and correct number of revolutions for threading the end portions of the spring C together can be achieved.

After a pair of heads has been moved by the rotor beyond or past the tracks 19 and 20, a part of the arm 15, preferably that part which supports the head 1a, is moved into direct or indirect coaction with a cam member 23 in order that the head 1a is moved somewhat farther from the head 1b. The aforementioned action results in a stretching of the joined end portions of the spring C located between the heads 1a and 1b. As a consequence, faulty joints in the spring will be disclosed since in a faulty joint the end portions of the spring will be pulled apart whereby when the spring is released by the heads the spring will return to its initial or original straight configuration and can easily be separated from the correctly formed ring-shaped springs which have passed this stretching test.

When the cam member 23 and the part of the arm 15 cooperate directly, the stretching test will be performed by separating the heads 1a and 1b a predetermined distance. It is also possible to perform the stretching test with a predetermined force, such as, for example, by providing a spring to transmit the movement between the cam 23 and the part of the arm in question.

After pair of heads has moved beyond the means for effecting the stretching test, the heads 1a and 1b enter between two spaced cam members 24 which cam members coact with the pins 14 to swing the components 2 upwardly about the shaft 5 and thus move the components 2 away from the components 3. It will be appreciated that the finished spring C will thereby be released from the wheels 8a and 8b so that the spring will hang freely from the components 3 while moving between the cam members 24. In this latter position, the spring C is ready for its removal from the heads 1a and 1b and, as illustrated in FIGURE 3, this removal may be effected by means of an arm 25 which is oscillatable about a vertical axis. The arm 23 may be continuously driven at a constant speed or adapted to be turned one or more revolutions about its axis when the spring C is moved by the heads 1a and 1b to a location suitable for its removal.

Following the removal of the spring C from the heads 1a and 1b, the heads will again be turned in a downward direction away from each other to the horizontal position by means of the cam member 16 after which a new working cycle begins.

This invention is not to be confined to any strict conformity to the showings in the drawings but changes or modifications may be made therein so long as such changes or modifications mark no material departure from the spirit and scope of the appended claims.

What is claimed is:

1. An apparatus for forming springs of ring-shape from helical springs having end portions with one end portion being of lesser diameter than the other end portion for permitting the end portion of lesser diameter to be threaded into the other end portion, comprising a first head, a plurality of wheels carried by the head for gripping one end portion of a spring, means mounting one of the wheels on the head for movement toward and away from the other wheel so that when the one wheel is moved away from the other wheel the one end portion can be introduced into or removed from the head, spring means normally urging the one wheel toward the other wheel, a second head, a plurality of wheels carried by the second head for gripping the other end portion of the spring, means mounting one of the wheels on the second head for movement toward and away from the other wheel so that when the one wheel is moved away from the other wheel the other end portion can be introduced into or removed from the second head, spring means normally urging the one wheel toward the other wheel, a plurality of supporting means adapted for movement along an endless path, means amounting the first and second heads pairwise on each supporting means, the wheels of the first head being approximately coaxial with the corresponding wheels of the second head when the first and second heads are in position to permit the one end portion of the spring to be threaded into the other end portion of the spring, cam means located in the path of movement of the supporting means operative to move the one wheel of the first and second heads away from the other wheel of the heads for permitting the other end portion of the spring to be positioned between the one wheel and other other wheel of the first head and the other end portion between the one wheel and the other wheel of the second head, the spring means for the first and second heads moving the respective one wheels toward the other wheels of the heads for gripping the end portions of the spring between the wheels when the supporting means move past the cam means, means in the path of movement of the supporting means operative to rotate the wheels of one head and the end portion gripped thereby, and means for restraining the wheels of the other head against rotation whereby one end portion is threaded into the other end portion.

2. The appartus as claimed in claim 1 in which said supporting means constitute a rotor.

3. The apparatus as claimed in claim 1 in which the heads are turnable relative to the supporting means about axes substantially parallel to each other and substantially perpendicular to the axes of rotation of the wheels.

4. An apparatus for forming springs of ring-shape from helical springs having end portions with one end portion being of lesser diameter than the other end portion for permitting the end portion of lesser diameter to be threaded into the other end portion, comprising a first head, a plurality of wheels carried by the head for gripping one end portion of a spring, means mounting one of the wheels on the head for movement toward and away from the other wheel so that when the one wheel is moved away from the other wheel the one end portion can be introduced into or removed from the head, spring means normally urging the one wheel toward the other wheel, brake means for coaction with at least one of the wheels, a second head, a plurality of wheels carried by the second head for gripping the other end portion of the spring, means mounting one of the wheels on the second head for movement toward and away from the other wheel so that when the one wheel is moved away from the other wheel the other end portion can be introduced into or removed from the second head, spring means normally urging the one wheel toward the other wheel, brake means for coaction with at least one of the wheels, a plurality of supporting means adapted for movement along an endless path, means mounting the first and second heads pairwise on each supporting means, the wheels of the first head being approximately coaxial with the corresponding wheels of the second head when the first and second heads are in position to permit the one end portion of the spring to be threaded into the other end portion of the spring, cam means located in the path of movement of the supporting means operative to move the one wheel of the first and second heads away from the other wheel of the heads for permitting the one end portion of the spring to be positioned between the one wheel and other wheel of the first head and the other end portion between the one wheel and the other wheel of the second head, the spring means for the first and second heads moving the respective one wheels toward the other wheels of the heads for gripping the end portions of the spring between the wheels when the supporting means move past the cam means, and means in the path of movement of the supporting means operative sequentially to rotate the wheels of the first head and the end portion gripped thereby in a direction for unthreading the end portions for developing an initial stress in the spring while the wheels of the second head are restrained from rotation by the brake means and thereafter rotating the wheels and end portion gripped by the second head in a threading direction while the wheels of the first head are restrained from rotation by the brake means thereby threading together the end portions and releasing the initial twist in the spring.

5. An apparatus for forming springs of ring-shape from helical springs having end portions with one end portion being of lesser diameter than the other end portion for permitting the end portion of lesser diameter to be threaded into the other end portion, comprising a first head, a plurality of wheels carried by the head for gripping one end portion of a spring, means mounting one of the wheels on the head for movement toward and away from the other wheel so that when the one wheel is moved away from the other wheel the one end portion can be introduced into or removed from the head, spring means normally urging the one wheel toward the other wheel, brake means for coaction with at least one of the wheels, a second head, a plurality of wheels carried by the second head for gripping the other end portion of the spring, means mounting one of the wheels on the second head for movement toward and away from the other wheel so that when the one wheel is moved away from the other wheel the other end portion can be introduced into or removed from the second head, spring means normally urging the one wheel toward the other wheel, brake means for coaction with at least one of the wheels, a plurality of supporting means adapted for movement along an endless path, means mounting the first and second heads pairwise on each supporting means, the wheels of the first head being approximately coaxial with the corresponding wheels of the second head when the first and second heads are in position to permit the one end portion of the spring to be threaded into the other end portion of the spring, cam means located in the path of movement of the supporting means operative to move the one wheel of the first and second heads away from the other wheel of the heads for permitting the one end portion of the spring to be positioned between the one wheel and other wheel of the first head and the other end portion between the one wheel and the other wheel of the second head, the spring means for the first and second heads moving with respective one wheel toward the other wheels of the heads for gripping the end portions of the spring between the wheels when the supporting means move past the cam means, means in the path of movement of the supporting means operative sequentially to rotate the wheels of the first head and the end portion gripped thereby in a direction for unthreading the end portions for developing an initial stress in the spring while the wheels of the second head are restrained from rotation by the brake means and thereafter rotating the wheels and end portion gripped by the second head in a threading direction while the wheels of the first head are restrained from rotation by the brake means thereby threading together the end portions and releasing the initial twist in the spring, the heads being turnable relative to the supporting means about axes substantially parallel to each other and substantially perpendicular to the axes of rotation of the wheels, means for turning the heads of each pair 90° about the axes away from the associated head prior to gripping the end portion of the spring, and a holder in the path of movement of the supporting means for receiving a helical spring deformed to U shape adapted to be detachably held by the holder due to its own resiliency until the cam means move the one wheel of the first and second heads away from the other wheel of the heads whereupon the spring means for the first and second heads moves the respective one wheels towards the other wheels of the heads for gripping the end portion of the springs between the wheels.

6. The apparatus as claimed in claim 5 in which the heads are movable toward and away from each other in a direction substantially perpendicular to the axes and are capable of being moved in opposite directions 90° toward each other after the gripping of the end portions of the spring whereby such end portions will be held coaxial with each other and thereafter approach each other with the springs being brought into engagement with each other.

7. The apparatus as claimed in claim 5 in which the wheels of each head include gear portions adapted to mesh for imparting rotation thereto and the means in the path of movement of the supporting means to rotate the wheels include tracks cooperable with the periphery of at least one wheel of each of the heads.

8. The apparatus as claimed in claim 7 in which each track includes a holder, resilient material mounted on the holder, and the track being so disposed relative to the path of movement of the supporting means that the wheel periphery is brought into engagement with the resilient material for imparting rotary movement to the wheel.

9. The apparatus as claimed in claim 8 in which the track is mounted at an acute angle relative to the path of movement of the supporting means so that the wheel periphery will be brought into deeper engagement with the resilient material at the termination of the initial twisting operation and the threading operation, respectively, whereby a longer path of rotation is obtained when working with helical springs of larger diameter.

10. The apparatus as claimed in claim 9 further including means for moving the first, and second heads apart in an axial direction following the threading of the end portions of the spring for stretching the connection between such end portions.

11. The apparatus as claimed in claim 10 in which such means is constituted by spring means.

12. The apparatus as claimed in claim 5 including means for moving the heads apart in an axial direction following the threading of the end portions of the spring thereby stretching the connection between the springs, and cam means thereafter operable to move said one wheel of each of said heads away from the other wheel of each of said heads for enabling the spring to be removed from the heads.

References Cited

UNITED STATES PATENTS

| | | | |
|---|---|---|---|
| 1,685,322 | 9/1928 | Scott | 72—403 |
| 2,400,319 | 5/1946 | Tallion | 140—71 |
| 2,696,226 | 12/1954 | Kane | 140—88 |
| 3,079,956 | 3/1963 | Smith et al. | 140—88 |

RICHARD J. HERBST, *Primary Examiner.*

LOWELL A. LARSON, *Assistant Examiner.*